United States Patent Office 3,645,925
Patented Feb. 29, 1972

3,645,925
4,4′-DIMORPHOLINODIETHYL ETHER CATALYST FOR POLYURETHANE PREPARATION
George P. Speranza and Michael Cuscurida, Austin, Tex., assignors to Jefferson Chemical Company, Inc., Houston, Tex.
No Drawing. Filed July 31, 1970, Ser. No. 60,087
Int. Cl. C08g 22/38, 22/44
U.S. Cl. 260—2.5 AC
4 Claims

ABSTRACT OF THE DISCLOSURE

A new amine catalyst for a polyurethane reaction is 4,4′-dimorpolinodiethyl ether. The catalyst is specific for the isocyanate water portion of the urethane reaction and, therefore, is a valuable means of balancing the competing reactions during urethane formation. Flexible polyurethane foams may be used, for example, in cushioning, while rigid polyurethane foams may be used, for example, as insulation.

BACKGROUND OF THE INVENTION

Field of the invention

This invention pertains to the field of urethane catalysts.

Description of the prior art

It is known to prepare foamed polyurethanes by the reaction of a polyisocyanate, a polyol and a blowing agent, such as a halogenated hydrocarbon, water, or both, in the presence of a catalyst. The catalyst is employed to promote at least two and sometimes three major reactions that must proceed simultaneously and competitively at balanced rates during the process in order to provide a good polyurethane foam. One reaction is a chain-extending isocyanate-hydroxyl reaction by which a hydroxyl-containing molecule is reacted with an isocyanate-containing molecule to form a urethane. This increases the viscosity of the mixture and provides a polyurethane containing secondary nitrogen atoms in the urethane groups. A second reaction is a cross-linking isocyanate-urethane reaction by which an isocyanate-containing molecule reacts with a urethane group containing a secondary nitrogen atom. The third reaction is an isocyanate-water reaction, by which an isocyanate-terminated molecule is extended and by which carbon dioxide is generated to blow or assist in blowing the foam. The third reaction is not essential if an extraneous blowing agent, such as a halogenated normally liquid hydrocarbon, carbon dioxide, etc., is employed, but is essential if all, or even a part, of the gas for foam generation is to be generated by this in situ reaction (e.g., in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If chain extension is too rapid in comparison with carbon dioxide evolution, foam rise will be restricted, resulting in a high-density foam with a high percentage of poorly defined cells. The foam will not be stable in the absence of adequate cross-linking.

It has long been known that tertiary amines, such as trimethylamine, triethylamine, etc., are effective for catalyzing the second cross-linking reaction. Some of the tertiary amines are effective for catalyzing the third water-isocyanate reaction for carbon dioxide evolution. However, tertiary amines are only partially effective as catalysts for the first chain-extension reaction. To overcome this problem, the so-called "pre-polymer" technique has been developed wherein a hydroxy-containing polyol component is partially reacted with the isocyanate component in order to obtain a liquid pre-polymer containing free isocyanate groups. This pre-polymer is then reacted with additional polyol in the presence of a tertiary amine to provide a foam. This method is still commonly employed in preparing rigid urethane foams, but has proven less satisfactory for the production of flexible urethane foams.

For flexible foams, a one-step or "one-shot" process has been developed wherein a tertiary amine such as triethylenediamine is employed in conjunction with an organic tin compound. Triethylenediamine is particularly active for promoting the water-isocyanate reaction, and the tin compound is particularly active in synergistic combination with the triethylenediamine for promoting the chain-extension reaction. However, even here, the results obtained leave much to be desired. Triethylenediamine is a solid and must be dissolved before use to avoid processing difficulties. Also, many prior art amines tend to impart a strong amine odor to the polyurethane foam.

In accordance with the present invention, a new catalyst has been discovered, namely 4,4′-dimorpholinodiethyl ether having the following structural formula:

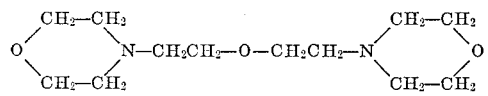

which overcomes the disadvantages of the prior art.

SUMMARY OF THE INVENTION

The invention is a new amine compound 4,4′-dimorpholinodiethyl ether which is a catalyst for polyurethane systems and has the following structural formula:

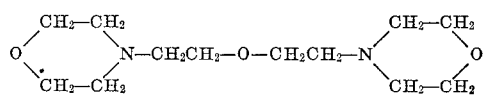

The catalyst has two unexpected and beneficial properties. It is hyperactive with respect to promotion of the isocyanate-water reaction and is ineffective for catalyzing the chain extension reaction. The invention is also the process for making polyurethane foam using as an amine catalyst, 4,4′-dimorpholinodiethyl ether.

DESCRIPTION OF THE PREFERRED EMBODIMENTS

In order to form polyurethane foams, several ingredients are essential: first, an isocyanate. The isocyanate may be difunctional such as toluene diisocyanate or the polyfunctional polyaryl isocyanates. The polyaryl isocyanates are produced by the phosgenation of the reaction product of aniline and formaldehyde. Such reactions are well known and are described in U.S. Pats. 2,683,730, 3,277,173, 3,344,162 and 3,362,797, for example. The polyaryl isocyanates thus formed have functionalities greater than two which can be varied up to the higher functionality materials. In practice, however, functionalities greater than four are attained only with difficulty. However, for the purpose of practicing my invention, materials with a functionality as high as five may be used. It is preferred that the functionality be from two to about four.

The hydroxyl-containing polyol component which reacts with the isocyanate may suitably be a hydroxyl-containing polyester or polyol having a hydroxyl number ranging from about 700 to about 25, or lower. When it is desired to provide a flexible foam, the hydroxyl number is preferably in the range from about 25 to 60. For rigid foams, the hydroxyl number is preferably in the range from about 350 to 700. Semi-rigid foams of a desired flexibility are provided when the hydroxyl number is intermediate to the ranges just given.

When the polyol is a polyester, it is preferable to use, as the polyester, a resin having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids, a phthalic acid, terephthalic acid, isophthalic acid, or the like, is non-ethylenic and non-reactive. Thus, aromatic acids may be employed for the acid component. Aliphatic acids, such as succinic acid, adipic acid, sebacic acid, azelaic acid, etc., may be employed. The alcohol component for the polyester should preferably contain a plurality of hydroxyl groups and is preferably an aliphatic alcohol, such as ethylene glycol, propylene glycol, dipropylene glycol, diethylene glycol, glycerol, pentaerythritol, trimethylolethane, trimethylolpropane, mannitol, sorbitol, polyglucosides, etc. Mixtures of two or more of the above-identified alcohols may be employed also if desired. When a flexible urethane foam is desired, the polyol should preferably have an average functionality of from about two to about four and a molecular weight of from about 2000 to about 4000. For rigid foams, the functionality of the polyol component is preferably four or more (e.g., five to seven).

When the hydroxyl-containing component is a polyether polyol for use in flexible polyurethane foam, the polyol may be an alkylene oxide condensate of a polyhydric alcohol with a functionality of from about two to about four. The alkylene oxide may suitably be ethylene oxide, propylene oxide, or 1,2-butylene oxide, 1,4-butylene oxide or a mixture of some or all of these. The polyol will suitably have a molecular weight within the range of from about 500 to about 7000. For flexible polyether polyurethane foams, the alkylene oxide is preferably propylene oxide or a mixture of propylene oxide and ethylene oxide and the molecular weight is preferably within the range of about 2000 to 4000.

For rigid polyether polyurethane foams, the polyol should have a functionality of four or more (e.g., five to seven) and a molecular weight of from about 300 to about 1000. Polyols for rigid polyether polyurethane foams may be made in various ways including the addition of an alkylene oxide as above to a polyhydric alcohol with a functionality of from four to seven. These polyols may also be, for example, Mannich condensation products of a phenol, an alkanolamine, and formaldehyde which Mannich condensation product is then reacted with an alkylene oxide. See U.S. Pat. 3,297,597.

The amount of hydroxyl-containing polyol compound to be used relative to the isocyanate compound in both polyester and polyether foams normally should be such that the isocyanato groups are present in at least an equivalent amount, and preferably, in slight excess, compared with the free hydroxyl groups. Preferably, the ingredients will be proportioned so as to provide from about 1.05 to about 1.5 mol equivalents of isocyanato groups per mol equivalent of hydroxyl groups.

When water is used, the amount of water, based on the hydroxyl compound, is suitably within the range of about 0.05 to about 0.25 mol per mol equivalent of hydroxy compound.

It is within the scope of the present invention to utilize an extraneously added inert blowing agent such as a gas or gas-producing material. For example, halogenated low-boiling hydrocarbons, such as trichloromonofluoromethane, methylene chloride, carbon dioxide, nitrogen, natural gas, etc., may be used. The inert blowing agent reduces the amount of excess isocyanate and water that is required in preparing flexible urethane foam. For a rigid foam, it is preferable to avoid the use of water and to use exclusively the extraneous blowing agent. Selection of the proper blowing agent is well within the knowledge of those skilled in the art. See, for example, U.S. Pat. 3,072,082.

The catalyst to be used in the preparation of rigid polyether polyurethane foams in accordance with the present invention, based on the combined weight of the hydroxyl-containing compound and polyisocyanate, is from about 0.02 to about 0.2 weight percent of the tertiary amine 4,4'-dimorpholinodiethyl ether either alone or in a mixture with one or more other tertiary amines.

The catalyst to be used in the preparation of flexible polyether polyurethane foams in accordance with the present invention, based on the combined weight of the hydroxyl-containing compound and polyisocyante, is from about 0.02 to about 0.2 weight percent of the tertiary amine 4,4'-dimorpholinodiethyl ether either alone or in a mixture with one or more other tertiary amines and from about 0.1 to about 0.4 weight percent of an organic tin compound. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from one to eight carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

An amine catalyst mixture must be used in the preparation of flexible polyester polyurethane foams. The catalyst mixture to be used in the praparation of polyester flexible foams in accodrance with the present invention, based on the combined weight of the hydroxyl containing compound and polyisocyanate, is from about 0.02 to about 0.2 of the tertiary amine 4,4'-dimorpholinodiethyl ether with one or more other tertiary amines, such as trialkylamines (e.g., trimethylamine, triethylamine), heterocyclic amines, such as N-alkylmorpholines (e.g., N-alkylmorpholines, N-methylmorpholine, N-ethylmorpholine, etc.), 1,4-dimethylpiperazine, triethylenediamine, etc., aliphatic polyamines, such as N,N,N'N'-tetramethyl-1,3-butanediamine.

Conventional formulation ingredients are also employed, such as, for example, foam stabilizers also known as silicone oils or emulsifiers. The foam stabilizer may be an organic silane or siloxane. For example, compounds may be used having the formula:

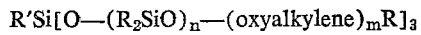
R'Si[O—(R₂SiO)ₙ—(oxyalkylene)ₘR]₃ wherein R is an alkyl group containing from one to four carbon atoms; $n$ is an integer of four to eight; $m$ is an integer of 20 to 40; and the oxyalkylene groups are derived from propylene oxide and ethylene oxide. See, for example, U.S. Pat. 3,194,773.

In preparing a flexible foam, the ingredients may be simultaneously, intimately mixed with each other by the so-called "one-shot" method to provide the foam by a one-step process. In this instance, water should comprise at least a part (e.g., 10% to 100%) of the blowing agent. The foregoing methods are known to those skilled in the art, as evidenced by the following publication: duPont Foam Bulletin, "Evaluation of Some Polyols in One-Shot Resilient Foams," Mar. 22, 1960.

When it is desired to prepare rigid foams, the "one-shot" method or the so-called "quasi-prepolymer method" is employed, wherein the hydroxyl-containing component preferably contains from about four to seven reactive hydroxyl groups, on the average, per molecule.

In accordance with the "quasi-prepolymer method," a portion of the hydroxyl-containing component is reacted in the absence of a catalyst with the polyisocyaante component in proportions so as to provide from about 20% to about 40% of free isocyanato groups in the reaction product, based on the polyol. To prepare a foam, the remaining portion of the polyol is added and the two components are allowed to react in the presence of catalytic systems such as those discussed above and other appropriate additives, such as blowing agents, foam stabilizing agents, fire retardants, etc. The blowing agent (e.g., a halogenated lower aliphatic hydrocarbon), the foam-stabilizing agent, the fire retardant, etc., may be added to either the prepolymer or remaining polyol, or both, prior to the mixing of the component, whereby at the end of the reaction a rigid polyurethane foam is provided.

Urethane elastomers and coatings may be prepared also by known techniques in accordance with the present invention wherein 4,4'-dimorpholinodiethyl ether is used as a catalyst. See, for example, duPont Bulletin PB-2, by Remington and Lorenz, entitled, "The Chemistry of Urethane Coatings."

The invention will be illustrated further with respect to the following specific examples, which are given by way of illustration and not as limitations on the scope of this invention.

PREPARATION OF 4,4'-DIMORPHOLINODIETHYL ETHER

Example I

To a 1400 ml. rocking autoclave was added 131 g. (1.5 mols) of morpholine and 212 g. (2.0 mols) of diethylene glycol and 50 g. of a nickel catalyst. The autoclave was flushed with hydrogen, sealed, and pressurized with hydrogen to about 2000–2500 p.s.i. for five hours. The catalyst was filtered off and 308 grams of colorless liquid was recovered. About 32 g. of 4,4'-dimorpholinodiethyl ether was recovered by distillation at 147° C. at 3 mm. pressure. The identification of the product was confirmed by infrared analysis.

CATALYTIC ACTIVITY OF 4,4'-DIMORPHOLINODIETHYL ETHER

Example II

This example demonstrates the low order of reactivity that 4,4'-dimorpholinodiethyl ether exhibits toward the isocyanate-hydroxyl reaction. In this test 0.25 equivalents of a 3000 molecular weight propylene oxide adduct of glycerine was reacted with 0.50 equivalents of toluene diisocyanate. The amine catalysts were used at 0.2 weight percent basis polyol weight.

Catalyst: Max. temp. rise $\Delta$ ° C./sec.
- Triethylenediamine _____ 0.219
- Tetramethyl-1,3-propanediamine _____ 0.0417
- N,N-dimethylethanolamine _____ 0.0322
- N,N'-dimethylpiperazine _____ 0.0142
- 4,4'-dimorpholinodiethyl ether _____ 0.0039
- N-ethylmorpholine _____ 0.0035

4,4'-DIMORPHOLINODIETHYL ETHER AS A CATALYST FOR FLEXIBLE POLYETHER POLYURETHANE FOAM

Example III

This example will illustrate the use of 4,4'-dimorpholinodiethyl ether as a catalyst in the preparation of flexible polyether polyurethane foam. All of the reactants in the formulation given below, except the toluene diisocyanate, were stirred one minute using a Cowles-type stirrer operated at 2580 revolutions per minute. The isocyanate was then added and the reactants mixed an additional five to six seconds. The foaming mixture was then poured into a 12-inch x 12-inch x 6-inch box and allowed to rise to full height. The rise was complete in two minutes. The foam was cured one hour at 110° C. and then for several days at room temperature before testing.

Formulation, p.b.w.:
- 3000 m.w. propylene oxide adduct of glycerine _ 100
- Water _____ 3.5
- Silicone stabilizer _____ 1.4
- 4,4'-dimorpholinodiethyl ether _____ 0.6
- Stannous octoate _____ 0.4
- Trichloromonofluoromethane _____ 7.0
- Toluene diisocyanate _____ 44.6

Foam Properties, ASTM 1564-67T:
- Density, p.c.f. _____ 1.4
- Indentation load deflection, three inch:
  - 25% _____ 25
  - 65% _____ 44
- Compression set, percent:
  - 50% _____ 2.8
  - 90% _____ 6.7
- Tensile strength, p.s.i. _____ 18
- Elongation, percent _____ 256

4,4'-DIMORPHOLINODIETHYL ETHER AS A CATALYST FOR RIGID POLYETHER POLYURETHANE FOAMS

Example IV

This example will illustrate the preparation of rigid polyether polyurethane foams using 4,4'-dimorpholinodiethyl ether as the catalyst. The polyol used is a 417 hydroxyl number methyl glucoside-propylene oxide product. The mixing procedure described in Example III was used in this example.

|  | IVa | IVb |
|---|---|---|
| Formulation, pbw.: | | |
| Polyol | 41.2 | 41.2 |
| Polyarylisocyanate | 43.8 | 43.8 |
| Silicone stabilizer | 0.5 | 0.5 |
| Trichloromonofluoromethane | 13.5 | 13.5 |
| 4,4'-dimorpholinodiethyl ether | 1.0 | 1.0 |
| Dibutyltindilaurate | | 0.05 |
| Reaction details: | | |
| Cream time, seconds | 180 | 75 |
| Rise time, seconds | 900 | 210 |
| Tack free, seconds | 600 | 160 |
| Foam properties: | | |
| Density, p.c.f. (ASTM D1622-63) | 2.3 | 2.2 |
| Compression (10%), p.s.i. (ASTM 1621) | 32.5 | 40.9 |
| Dimensional stability (ASTM D2126): | | |
| 0° F., one week: | | |
| Percent weight change | +0.7 | +1.2 |
| Percent linear change | −2.0 | −1.5 |
| Percent volume change | −2.5 | −2.3 |
| 180° F., dry, one week: | | |
| Percent weight change | −1.0 | −0.4 |
| Percent linear change | +2.0 | +1.5 |
| Percent volume change | +2.2 | +2.2 |
| 158° F., 100% R. H.: | | |
| 12 hours: | | |
| Percent weight change | −0.45 | 0.0 |
| Percent linear coange | +2.0 | +3.5 |
| Percent volume change | +4.2 | +5.1 |
| 24 hours: | | |
| Percent weight change | −2.0 | −1.6 |
| Percent linear change | +2.5 | +3.5 |
| Percent volume change | +3.9 | +5.1 |
| 1 week: | | |
| Percent weight change | −1.8 | −1.4 |
| Percent linear change | +4.5 | +5.0 |
| Percent volume change | +7.9 | +7.0 |

4,4'-DIMORPHOLINODIETHYL ETHER AS A CATALYST FOR FLEXIBLE POLYESTER POLYURETHANE FOAMS

Example V

This example will illustrate the preparation of a flexible polyester polyurethane foam using a catalyst composition containing 4,4'-dimorpholinodiethyl ether. The foam was made by the one-shot method on a small laboratory type foam machine.

Formulation, p.b.w.:
- Polyester polyol _____ 100
- Water _____ 3.6
- Silicone emulsifier _____ 1.0
- 4,4'-dimorpholinodiethyl ether _____ 0.64
- 1,4-dimethylpiperazine _____ 0.26
- Palmityl dimethyl amine _____ 0.1
- Toluene diisocyanate _____ 42.5

Reaction details:
- Cream time, sec. _____ 9
- Rise time, sec. _____ 85

Foam properties, ASTM 1564–67T:
  Density, p.c.f. _____ 1.9
  Indentation load deflection, four inch:
    25% _____ 49.3
    65% _____ 93.5
  Tensile strength, p.s.i. _____ 30
  Ultimate elongation, percent _____ 340
  Tear resistance, pli. _____ 3.9
  Compression set, percent:
    50% _____ 6.2
    90% _____ 6.5

We claim:
1. A method for producing a urethane which comprises:
   reacting an organic polyisocyanate with an organic hydroxy compound in the presence of a catalystic amount of 4,4'-dimorpholinodiethyl ether, said organic hydroxy compound being either a polyhydric alcohol or a linear polyester having terminal hydroxy groups, which polyesters are obtained from the reaction of a polycarboxylic acid with a polyhydric alcohol.

2. A method for preparing a flexible polyether polyurethane foam according to claim 1 which comprises:
   reacting in the presence of a blowing agent toluene diisocyanate with a long chain hydroxyl-terminated condensation product of a polyhydric alcohol with alkylene oxides of 2 to 4 carbon atoms in the presence of a catalytic amount of 4,4'-dimorpholinodiethyl ether, said toluene diisocyanate being employed in an amount sufficient to provide 1.0 to 1.5 mol equivalents of isocyanato groups per mol equivalent of hydroxy groups said condensation product having a molecular weight within the range of about 2000 to about 7000 and a functionality from about two to about four.

3. A method for preparing a rigid polyether polyurethane foam according to claim 1 which comprises:
   reacting in the presence of a blowing agent a polyisocyanate with a hydroxy terminated polyether in the presence of a catalytic amount of 4,4'-dimorpholinodiethyl ether and a blowing agent, said polyisocyanate being employed in an amount sufficient to provide 1.00 to 1.5 mol equivalents of isocyanate groups per mol equivalent of hydroxy groups in the hydroxy terminated polyether, said polyether having from about 3 to about 7 hydroxyl groups per molecule and a hydroxyl number with range 300 to 700.

4. A method for preparing a flexible polyester polyurethane foam according to claim 1 which comprises:
   reacting in the presence of a blowing agent a toluene diisocyanate with a hydroxy terminated condensation product of a polycarboxylic acid and a polyhydric alcohol in the presence of a catalytic mixture containing 4,4'-dimorpholinodiethyl ether, said toluene diisocyanate being employed in an amount sufficient to provide 1.0 to 1.5 mol equivalents of isocyanato groups per mol equivalent of hydroxy groups, said condensation product having a functionality of about two to about four and a molecular weight of from about 2000 to about 4000.

References Cited
UNITED STATES PATENTS

| | | | |
|---|---|---|---|
| 3,443,976 | 5/1969 | Dodson | 106—90 |
| 3,438,908 | 4/1969 | Reymore | 260—2.5 X |
| 3,234,153 | 2/1966 | Britain | 260—2.5 |
| 3,001,955 | 9/1961 | Taub | 260—2.5 |

DONALD E. CZAJA, Primary Examiner

C. W. IVY, Assistant Examiner

U.S. Cl. X.R.

260—75 NC, 77.5 AC, 246 B

UNITED STATES PATENT OFFICE

CERTIFICATE OF CORRECTION

Patent No. 3,645,925            Dated February 29, 1972

George P. Speranza and Michael Cuscurida
Assignors to Jefferson Chemical Company, Inc.
Houston, Texas, a corporation of Delaware It is certified that errors appear in the above-identified patent and that Letters Patent are hereby corrected as shown below:

In column 2, line 55, "3,362,797" should read -- 3,362,979 --. In column 4, line 67, "polyisocyaante" should read -- polyisocyanate --. In column 6, line 44, "coange" should read -- change --. In column 7, line 16, "catalystic" should read -- catalytic --.

Signed and sealed this 18th day of July 1972.

(SEAL)
Attest:

EDWARD M. FLETCHER, JR.        ROBERT GOTTSCHALK
Attesting Officer               Commissioner of Patents